(12) United States Patent
Kusafuka et al.

(10) Patent No.: US 11,543,714 B2
(45) Date of Patent: Jan. 3, 2023

(54) DISPLAY DEVICE, HEAD-UP DISPLAY, AND MOVING BODY

(71) Applicant: KYOCERA Corporation, Kyoto (JP)

(72) Inventors: Kaoru Kusafuka, Tokyo (JP); Mitsuhiro Murata, Yao (JP)

(73) Assignee: KYOCERA Corporation, Kyoto (JP)

( * ) Notice: Subject to any disclaimer, the term of this patent is extended or adjusted under 35 U.S.C. 154(b) by 11 days.

(21) Appl. No.: 17/261,718

(22) PCT Filed: Jul. 26, 2019

(86) PCT No.: PCT/JP2019/029480
§ 371 (c)(1),
(2) Date: Jan. 20, 2021

(87) PCT Pub. No.: WO2020/022495
PCT Pub. Date: Jan. 30, 2020

(65) Prior Publication Data
US 2021/0271128 A1 Sep. 2, 2021

(30) Foreign Application Priority Data
Jul. 27, 2018 (JP) .............................. JP2018-141880

(51) Int. Cl.
*G02F 1/1347* (2006.01)
*G02F 1/1333* (2006.01)
(Continued)

(52) U.S. Cl.
CPC ........ *G02F 1/1347* (2013.01); *G02F 1/13454* (2013.01); *G02F 1/133322* (2021.01); *G02F 1/133512* (2013.01); *G02F 1/136277* (2013.01)

(58) Field of Classification Search
CPC .......... G02F 1/13454; G02F 1/133322; G02F 1/133512; G02F 1/136277; G02F 1/1347
See application file for complete search history.

(56) References Cited

U.S. PATENT DOCUMENTS

2012/0069264 A1 3/2012 Inoue
2013/0342512 A1 12/2013 Smith et al.
(Continued)

FOREIGN PATENT DOCUMENTS

| JP | H07287193 A | 10/1995 |
|---|---|---|
| WO | 2016047009 A1 | 3/2016 |
| WO | 2018105534 A1 | 6/2018 |

*Primary Examiner* — Dung T Nguyen
(74) *Attorney, Agent, or Firm* — Studebaker & Brackett PC

(57) ABSTRACT

A display device includes: a first panel including a first image-forming surface for forming a first image visually recognized by a user and a plurality of first pixels; a second panel including a second image-forming surface for forming a second image visually recognized by the user and a plurality of second pixels; and a half-wavelength plate located between the first image-forming surface and the second image-forming surface. The half-wavelength plate includes an optical axis, is configured to be capable of transmitting incident light from either one panel of the first panel and the second panel, and of emitting light as emission light to the other panel. A polarization direction of the emission light from the half-wavelength plate is determined based on a polarization direction of the incident light on the half-wavelength plate and a direction of the optical axis.

18 Claims, 11 Drawing Sheets

(51) Int. Cl.
  *G02F 1/1335* (2006.01)
  *G02F 1/1345* (2006.01)
  *G02F 1/1362* (2006.01)

(56) References Cited

U.S. PATENT DOCUMENTS

2015/0042704 A1* 2/2015 Smith .................. G09G 3/3406
                                                   345/1.3
2016/0349507 A1* 12/2016 Hayashi ................ G02B 27/01
2020/0074896 A1   3/2020 Kusafuka et al.

* cited by examiner

DISPLAY DEVICE, HEAD-UP DISPLAY, AND MOVING BODY

CROSS-REFERENCE TO RELATED APPLICATION

This application claims priority to Japanese Patent Application No. 2018-141880 (filed on Jul. 27, 2018), the contents of which are incorporated herein by reference in its entirety.

TECHNICAL FIELD

The present disclosure relates to a display device, a head-up display, and a moving body.

BACKGROUND

In a related art, in a virtual image magnification projection system, a configuration that provides a user with stereoscopic vision by a parallax barrier is known. This technique is described in, for example, Japanese Unexamined Patent Publication JP-A 7-287193 (1995).

SUMMARY OF INVENTION

A display device according to an embodiment of the disclosure includes a first panel, a second panel, and a half-wavelength plate. The first panel includes a first image-forming surface for forming a first image visually recognized by a user, and a plurality of first pixels aligned in a first alignment. The first panel can control light transmittance of the respective first pixels by controlling a polarization direction of light passing through the respective first pixels. The first panel is configured to form the first image on the first image-forming surface. The second panel includes a second image-forming surface for forming a second image visually recognized by the user, and a plurality of second pixels aligned in a second alignment. The second panel can control light transmittance of the respective second pixels by controlling a polarization direction of light passing through the respective second pixels. The second panel is configured to form the second image on the second image-forming surface. The half-wavelength plate is located between the first image-forming surface and the second image-forming surface. The half-wavelength plate includes an optical axis. The half-wavelength plate is configured to be capable of transmitting incident light from either one panel of the first panel and the second panel, and of emitting light as emission light to the other panel. A polarization direction of the emission light from the half-wavelength plate is determined based on the polarization direction of the incident light on the half-wavelength plate and a direction of the optical axis.

A head-up display according to an embodiment of the disclosure includes a display device and an optical system. The display device includes a first panel, a second panel, and a half-wavelength plate. The first panel includes a first image-forming surface for forming a first image visually recognized by a user and a plurality of first pixels aligned in a first alignment. The first panel can control light transmittance of the respective first pixels by controlling a polarization direction of light passing through the respective first pixels. The first panel is configured to form the first image on the first image-forming surface. The second panel includes a second image-forming surface for forming a second image visually recognized by the user and a plurality of second pixels aligned in a second alignment. The second panel can control light transmittance of the respective second pixels by controlling a polarization direction of light passing through the respective second pixels. The second panel is configured to form the second image on the second image-forming surface. The half-wavelength plate is located between the first image-forming surface and the second image-forming surface. The half-wavelength plate includes an optical axis. The half-wavelength plate is configured to be capable of transmitting incident light from either one panel of the first panel and the second panel, and of emitting light as emission light to the other panel. A polarization direction of the emission light from the half-wavelength plate is determined based on the polarization direction of the incident light on the half-wavelength plate and a direction of the optical axis. The optical system is configured to cause image light of an image which is formed on an image-forming surface of a panel of the first panel and the second panel which is on a side closer to a user, to reach a left eye and a right eye of the user, in the display device.

A moving body according to an embodiment of the disclosure includes a head-up display including a display device and an optical system. The display device includes a first panel, a second panel, and a half-wavelength plate. The first panel includes a first image-forming surface for forming a first image visually recognized by a user and a plurality of first pixels aligned in a first alignment. The first panel can control light transmittance of the respective first pixels by controlling a polarization direction of light passing through the respective first pixels. The first panel is configured to form the first image on the first image-forming surface. The second panel includes a second image-forming surface for forming a second image visually recognized by the user and a plurality of second pixels aligned in a second alignment. The second panel can control light transmittance of the respective second pixels by controlling a polarization direction of light passing through the respective second pixels. The second panel is configured to form the second image on the second image-forming surface. The half-wavelength plate is located between the first image-forming surface and the second image-forming surface. The half-wavelength plate includes an optical axis. The half-wavelength plate is configured to be capable of transmitting incident light from either one panel of the first panel and the second panel, and of emitting light as emission light to the other panel. A polarization direction of the emission light from the half-wavelength plate is determined based on the polarization direction of the incident light on the half-wavelength plate and a direction of the optical axis. The optical system is configured to cause image light of an image which is formed on an image-forming surface of a panel of the first panel and the second panel which is on a side closer to a user, to reach a left eye and a right eye of the user, in the display device.

DETAILED DESCRIPTION

Figure 1:
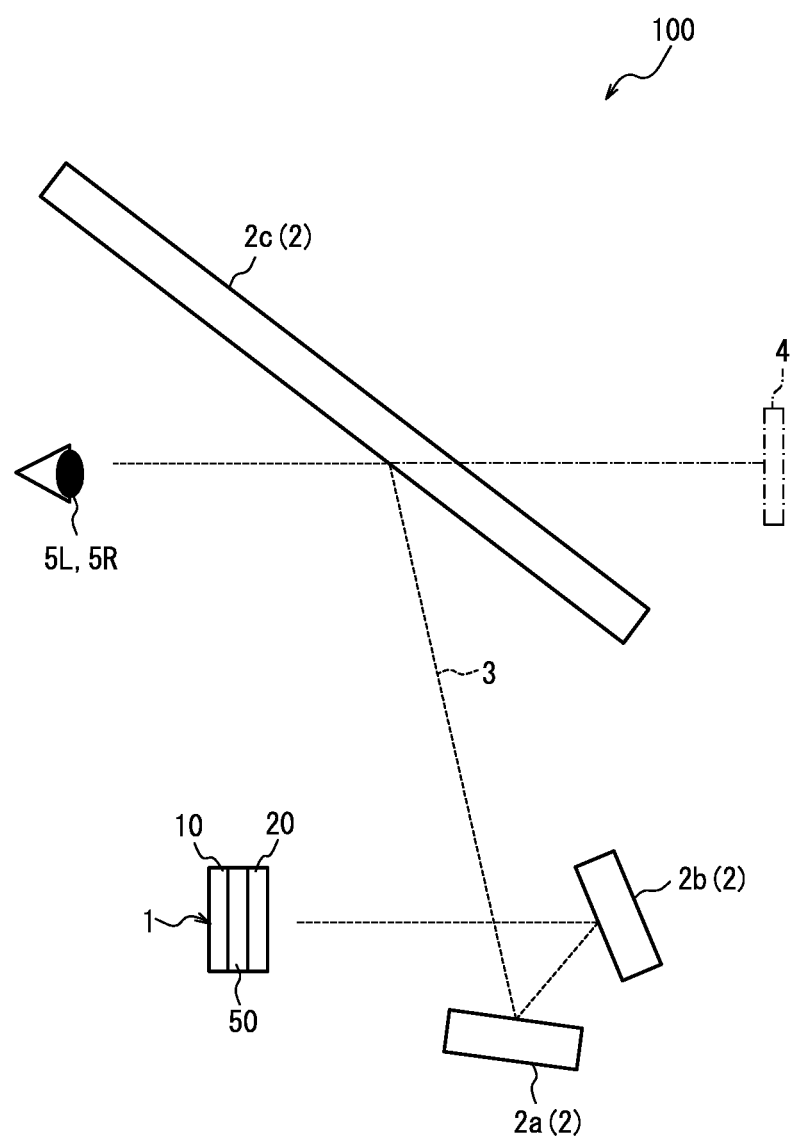
FIG. 1 is a diagram illustrating a configuration example of a head-up display according to an embodiment.

As illustrated in FIG. 1, a head-up display 100 according to an embodiment includes a display device 1 and an optical system 2. The head-up display 100 is also referred to as an HUD (Head-Up Display). The display device 1 includes a display panel 10, a barrier panel 20, and a half-wavelength plate 50. The head-up display 100 projects different images on a left eye 5L of a user and a right eye 5R of the user by causing the display panel 10 to display an image and the barrier panel 20 to dim a part of image light. That is, the head-up display 100 projects a parallax image on both eyes of the user. It can be said that the parallax image is an image including separate images projected on each of the left eye 5L and right eye 5R of the user. The user can see the image stereoscopically by viewing the parallax image with the left eye 5L and the right eye 5R.

The display panel 10 displays a left-eye image projected on the left eye 5L of the user and displays a right-eye image projected on the right eye 5R of the user. In the display panel 10, regions for displaying the left-eye image and the right-eye image are also referred to as a left-eye image region and a right-eye image region, respectively. The display panel 10 may include a plurality of left-eye image regions and a plurality of right-eye image regions.

The barrier panel 20 is positioned along the display panel 10. The barrier panel 20 prevents the right-eye image displayed on the display panel 10 from being projected or makes it difficult for the right-eye image to be projected onto the left eye 5L while the right-eye image is being projected onto the right eye 5R of the user. The barrier panel 20 prevents the left-eye image displayed on the display panel 10 from being projected or makes it difficult for the left-eye image to be projected onto the right eye 5R while the left-eye image is being projected onto the left eye 5L of the user. The barrier panel 20 is configured to form a parallax barrier. The parallax barrier includes a plurality of light-transmitting regions and a plurality of dimming regions. The plurality of light-transmitting regions are configured to transmit image light. The plurality of dimming regions are configured to reduce image light. The barrier panel 20 functions as an active barrier that can change the shape of the plurality of light-transmitting regions and the plurality of dimming regions.

The display panel 10 and the barrier panel 20 are also referred to as a first panel and a second panel, respectively. The display panel 10 and the barrier panel 20 are also simply referred to as panels. The display panel 10 and the barrier panel 20 are liquid crystal panels of a type driven by controlling a phase difference of light occurring due to the birefringence of the liquid crystal. The liquid crystal panel may be driven by a VA (Vertical Alignment) method or the like. The liquid crystal panel may be driven by a FFS (Fringe Field Switching) method, an IPS (In Plane Switching) method, an ECB (Electrically Control Birefringence) method, or the like.

The optical system 2 is positioned on an optical path 3 of the image light. The image light is emitted from the display panel 10 and the barrier panel 20 and reaches the left eye 5L and right eye 5R of the user. The optical system 2 is configured to form an image of image light related to the parallax image and project the parallax image onto both eyes of the user. That is, the optical system 2 is configured to form the parallax image on both eyes of the user. The optical system 2 may be configured to enlarge or reduce the parallax image so as to form an image on both eyes of the user. The optical system 2 includes an optical member 2a, an optical member 2b, and an optical member 2c. The number of optical members configuring the optical system 2 is not limited to three and may be two or less, or four or more. The optical member may include a reflective member including a convex or concave mirror. The optical member may include a refracting member including a convex lens or a concave lens. The convex lens includes a biconvex lens, a plano-convex lens, and a convex meniscus lens. The concave lens includes a biconcave lens, a plano-concave lens, and a concave meniscus lens. The optical member is not limited to the reflective member or the refracting member and may include various other optical members.

A virtual image 4 of the display device 1 is positioned at the tip of the two-dot chain line extending from the optical member 2c positioned closest to the left eye 5L and right eye 5R of the user to the opposite side of the user. The virtual image 4 is formed on the left eye 5L and right eye 5R of the user as a parallax image. That is, the user visually recognizes the virtual image 4 as a parallax image by the left eye 5L and the right eye 5R. By doing so, the user is provided with a stereoscopic vision.

Figure 2:
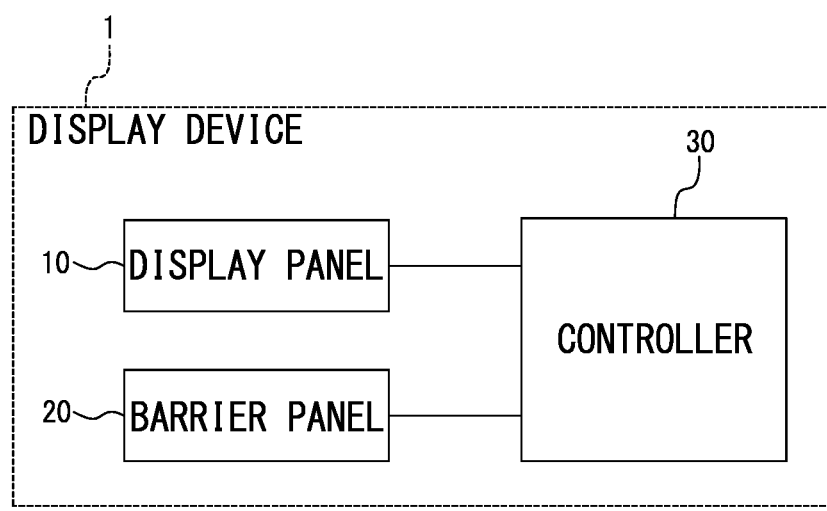
FIG. 2 is a block diagram illustrating a configuration example of a display device.

As illustrated in FIG. 2, the display device 1 includes the display panel 10, the barrier panel 20, and a controller 30.

The controller 30 is configured to control the display panel 10 and the barrier panel 20. The controller 30 is configured as, for example, a processor. The controller 30 may include one or more processors. The processor may include a general-purpose processor that loads a specific program and executes a specific function, and a dedicated processor specialized for a specific process. The dedicated processor may include an application specific integrated circuit (ASIC). The processor may include a programmable logic device (PLD). The PLD may include an FPGA (Field-Programmable Gate Array). The controller 30 may be either an SoC (System-on-a-Chip) or an SiP (System In a Package), in which one or a plurality of processors cooperate. The controller 30 may be configured to include a storage unit to store various information, a program for operating each component of the display device 1, and the like in the storage unit. The storage unit may be configured with, for example, a semiconductor memory or the like. The storage unit may function as a work memory of the controller 30.

Figure 3:
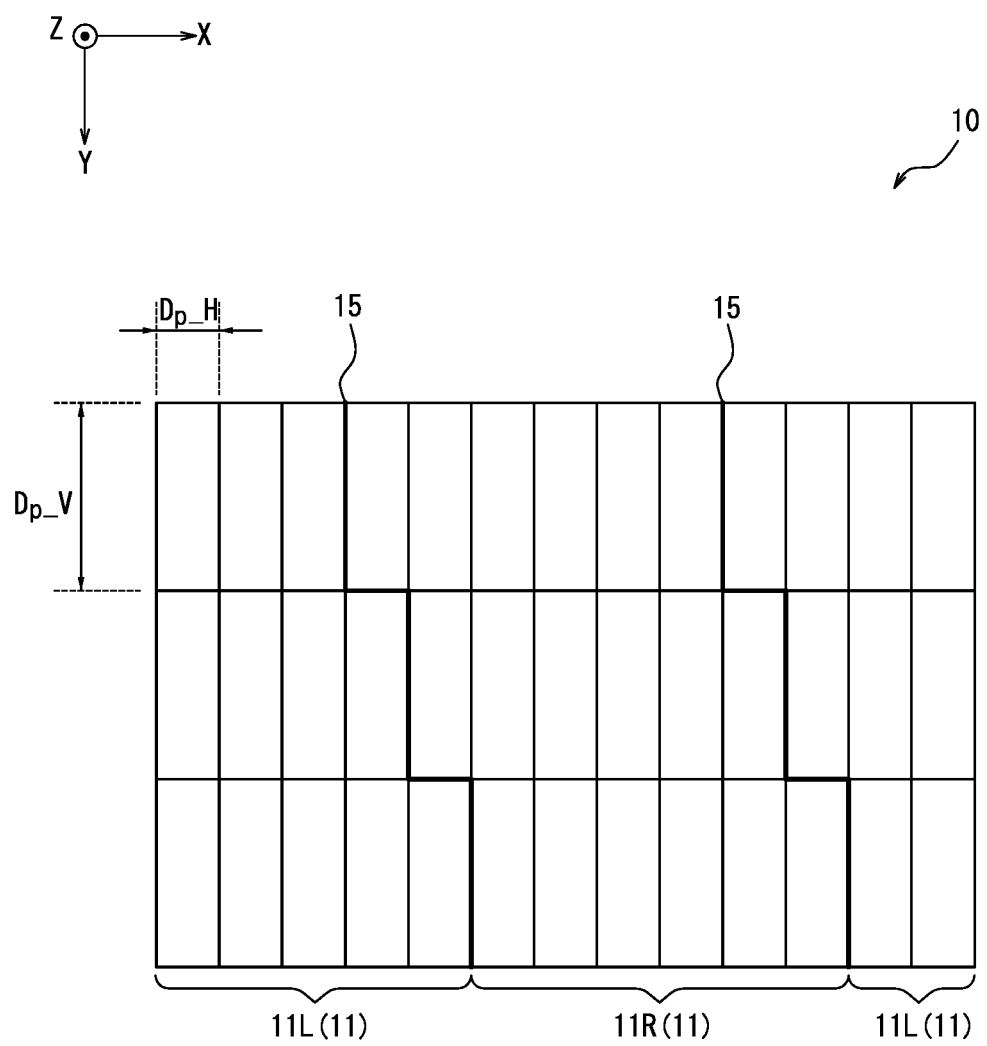
FIG. 3 is a plan view illustrating a configuration example of a display panel.

The display panel 10 includes a plurality of display pixels 11, as illustrated in FIG. 3, for example. The plurality of display pixels 11 are aligned in a grid shape. It is assumed that the grid axes representing the alignment of the plurality of display pixels 11 coincide with the X-axis and the Y-axis. The plurality of display pixels 11 are aligned at predetermined pitches in the X-axis direction and the Y-axis direction, respectively. The X-axis direction and the Y-axis direction are also referred to as a first display alignment direction and a second display alignment direction, respectively. The plurality of display pixels 11 are configured to be aligned in the first display alignment direction at a first display pixel pitch represented by Dp_H. The plurality of display pixels 11 are configured to be aligned in the second display alignment direction at a second display pixel pitch represented by Dp_V. The first display alignment direction and the second display alignment direction intersect each other. The first display alignment direction and the second display alignment direction may be orthogonal to each other. The first display pixel pitch and the second display pixel pitch may be the same or different.

The array of the plurality of display pixels 11 is divided into a plurality of regions by a plurality of display boundaries 15 represented by a staircase shape of a thick line. The plurality of display pixels 11 included in one of the regions divided by the plurality of display boundaries 15 are also referred to as first display pixels 11L. The display pixels 11 included in the other region divided by the plurality of display boundaries 15 are also referred to as second display pixels 11R. The plurality of display pixels 11 include a plurality of first display pixels 11L and a plurality of second display pixels 11R. The display boundary 15 is not limited to the shape illustrated in FIG. 3 and may have other shapes. The display panel 10 is configured to display the left-eye image on the plurality of first display pixels 11L and display the right-eye image on the plurality of second display pixels 11R. The display pixel 11 displaying the left-eye image is also referred to as a left-eye pixel. The display pixel 11 displaying the right-eye image is also referred to as a right-eye pixel. The plurality of display pixels 11 can include a plurality of left-eye pixels and a plurality of right-eye pixels. The regions in which the plurality of left-eye pixels and the plurality of right-eye pixels are aligned correspond to the plurality of left-eye image regions and the plurality of right-eye image regions, respectively. The plurality of display boundaries 15 can be determined by the controller 30. The plurality of display boundaries 15 may include a plurality of first display boundaries indicating a range in which the plurality of first display pixels 11L are aligned, and a plurality of second display boundaries indicating a range in which the plurality of second display pixels 11R are aligned. By doing so, the plurality of display pixels 11 that are neither the plurality of first display pixels 11L nor the plurality of second display pixels 11R can be represented.

Figure 4:
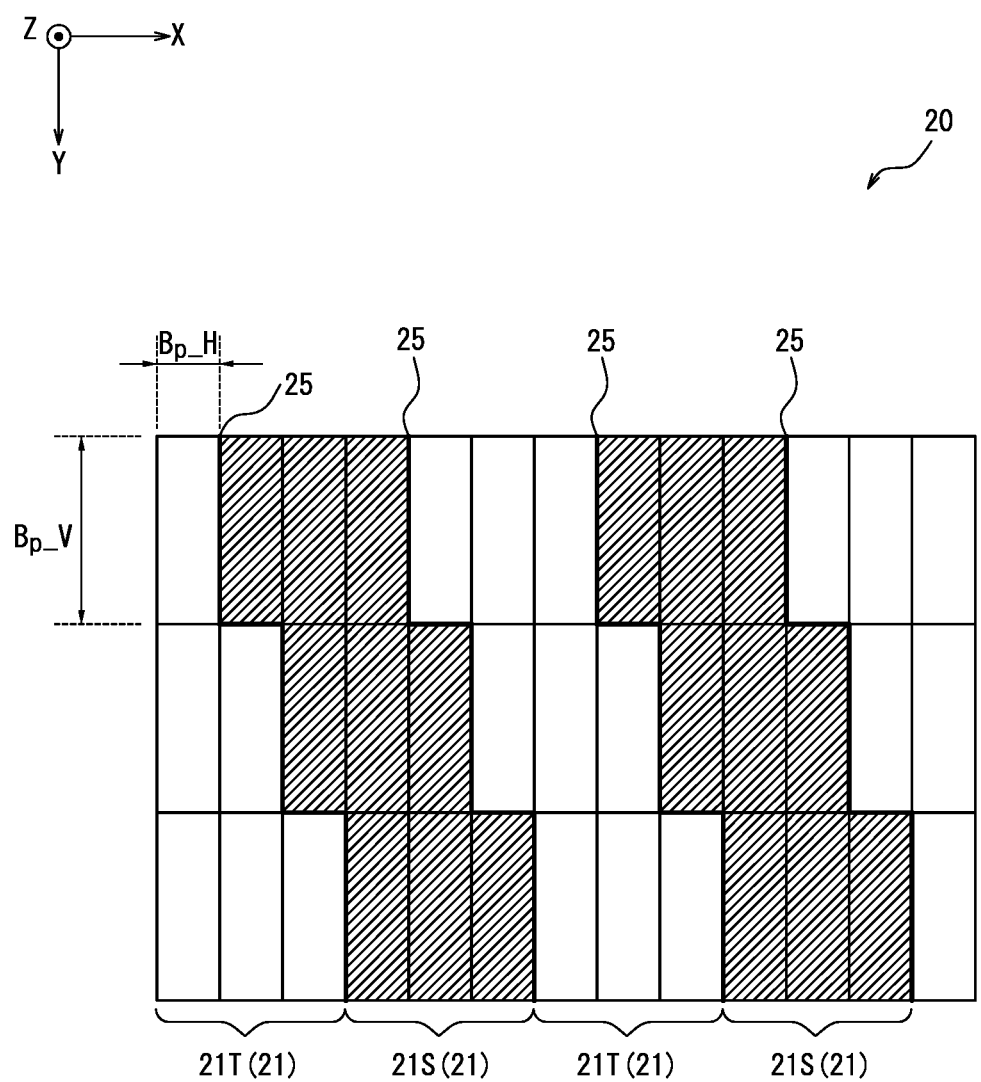
FIG. 4 is a plan view illustrating a configuration example of a barrier panel.

The barrier panel 20 includes a plurality of barrier pixels 21 as illustrated in FIG. 4, for example. The plurality of barrier pixels 21 are aligned in a grid shape. It is assumed that the grid axes representing the alignment of the plurality of barrier pixels 21 coincide with the X-axis and the Y-axis. The plurality of barrier pixels 21 are aligned at predetermined pitches in the X-axis direction and the Y-axis direction, respectively. The X-axis direction and the Y-axis direction are also referred to as a first barrier alignment direction and a second barrier alignment direction, respectively. The plurality of barrier pixels 21 are configured to be aligned in the first barrier alignment direction at a first barrier pixel pitch represented by Bp_H. The plurality of barrier pixels 21 are configured to be arranged in the second barrier alignment direction at a second barrier pixel pitch represented by Bp_V. The first barrier alignment direction and the second barrier alignment direction intersect each other. The first barrier alignment direction and the second barrier alignment direction may be orthogonal to each other. The first barrier pixel pitch and the second barrier pixel pitch may be the same or different.

The array of the plurality of barrier pixels 21 is divided into a plurality of regions by a plurality of barrier boundaries 25 represented by a staircase shape of a thick line. The barrier pixels 21 included in one of the regions divided by the plurality of barrier boundaries 25 are also referred to as first barrier pixels 21T. The barrier pixels 21 included in the other region divided by the plurality of barrier boundaries 25 are also referred to as second barrier pixels 21S. The plurality of barrier pixels 21 include a plurality of first barrier pixels 21T and a plurality of second barrier pixels 21S. The plurality of second barrier pixels 21S are represented by the hatching of diagonal lines. The plurality of barrier boundaries 25 are not limited to the shape illustrated in FIG. 4 and may have other shapes. The barrier panel 20 can be configured such that the plurality of first barrier pixels 21T transmit light at a first transmittance or higher and the plurality of second barrier pixels 21S reduce light with a transmittance less than a second transmittance which is lower than the first transmittance. The plurality of barrier pixels 21 that transmit light at the first transmittance or higher are also referred to as a plurality of light-transmitting pixels. The first transmittance may be, for example, 100% or may be a value close to 100%. The plurality of barrier pixels 21 that transmit light with a transmittance less than the second transmittance are also referred to as a plurality of dimming pixels. The second transmittance may be, for example, 0% or a value close to 0%. The regions in which the plurality of light-transmitting pixels and the plurality of dimming pixels are aligned correspond to the plurality of light-transmitting regions and the plurality of dimming regions, respectively. The first transmittance may be a value smaller than 50%, for example, 10%, as long as it is a range in which a sufficient contrast with the light transmitted through the plurality of dimming regions can be secured. The second transmittance may be a value larger than around 0%, for example, 10%, as long as it is a range in which a sufficient contrast with the light transmitted through the plurality of light-transmitting regions can be secured. A sufficient contrast ratio may be, for example, 100:1. The barrier boundary 25 can be determined by the controller 30. The plurality of barrier pixels 21 can be the first barrier pixels 21T or the second barrier pixels 21S depending on the barrier boundary 25 determined by the controller 30. The plurality of barrier pixels 21 are configured to be controlled by the controller 30 as the plurality of first barrier pixels 21T and the plurality of second barrier pixels 21S. Each barrier pixel 21 can be controlled by the controller 30 as the first barrier pixel 21T or the second barrier pixel 21S.

The plurality of display pixels 11 and the plurality of barrier pixels 21 are also simply referred to as a plurality of pixels. It can be said that the first panel and the second panel each include a plurality of pixels aligned in a predetermined alignment. At least a part of the predetermined alignment of pixels in the first panel may be configured to be the same as at least a part of the predetermined alignment of pixels in the second panel. It can be said that the first panel includes a plurality of first pixels aligned in a first alignment. It can be said that the second panel includes a plurality of second pixels aligned in a second alignment. At least a part of the first alignment may be the same as at least a part of the second alignment.

The first display pixel pitch and the first barrier pixel pitch may be configured to coincide with each other or may be configured to be different from each other. The second display pixel pitch and the second barrier pixel pitch may be configured to coincide with each other or may be configured to be different from each other. When the first display pixel pitch and the first barrier pixel pitch coincide with each other and the second display pixel pitch and the second barrier pixel pitch coincide with each other, it is also said that the display panel 10 and the barrier panel 20 have an equal pitch.

Figure 5:
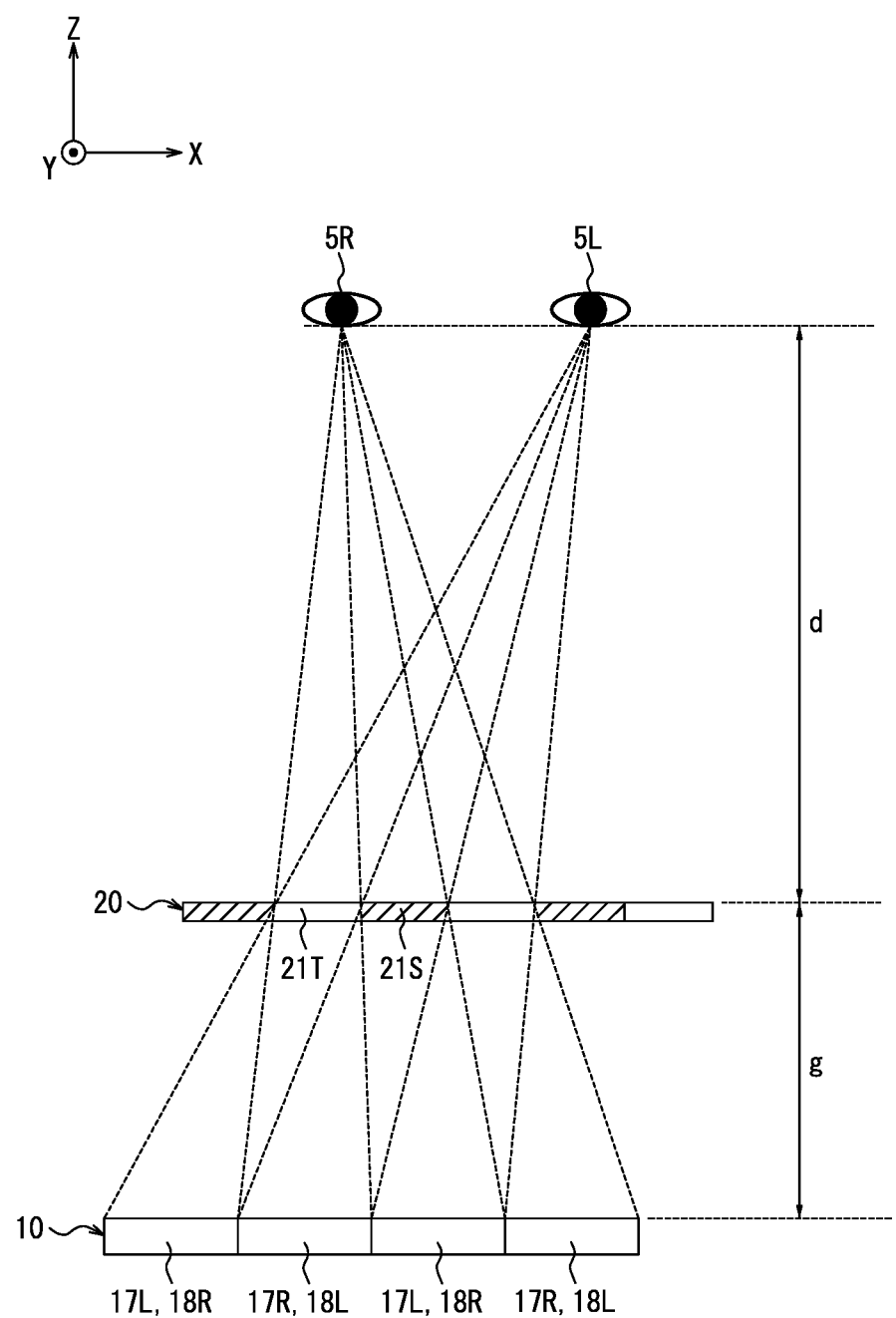
FIG. 5 is a cross-sectional view illustrating a relationship between a barrier and regions on the display panel.

As illustrated in FIG. 5, it is assumed that the left eye 5L and right eye 5R of the user are positioned apart from the barrier panel 20 by an observation distance represented by d. When the optical system 2 is positioned between the user and the barrier panel 20, the observation distance can be represented as a length of the optical path 3 based on the characteristics of the optical system 2. The left eye 5L and the right eye 5R can view the display image of the display panel 10 through the barrier panel 20. The barrier panel 20 includes a plurality of light-transmitting regions including the plurality of first barrier pixels 21T represented by white outlines and a plurality of dimming regions including the plurality of second barrier pixels 21S represented by the hatching of diagonal lines. The plurality of light-transmitting regions and the plurality of dimming regions are alternately and repeatedly aligned in the X-axis direction. A distance from the barrier panel 20 to the display panel 10 is also referred to as a gap and is represented by g.

The display panel 10 includes a plurality of left-eye visible regions 17L which are visually recognizable from the left eye 5L of the user and a plurality of right-eye visible regions 17R which are visually recognizable from the right eye 5R of the user, via the plurality of first barrier pixels 21T. The display panel 10 includes a plurality of left-eye non-visible regions 18L that impede visible recognition from the left eye 5L of the user, and a plurality of right-eye non-visible regions 18R that impede visible recognition from the right eye 5R of the user, by the plurality of second barrier pixels 21S. In other words, the plurality of left-eye non-visible regions 18L are regions that are not visually recognized or are difficult to be visually recognized, from the left eye 5L of the user. The plurality of right-eye non-visible region 18R are regions that are not visually recognized or difficult to be visually recognized from the right eye 5R of the user. The boundaries between the plurality of left-eye visible regions 17L and the plurality of left-eye non-visible regions 18L and the boundaries between the plurality of right-eye visible regions 17R and the plurality of right-eye non-visible regions 18R are each determined based on the plurality of barrier boundaries 25. In other words, the plurality of first barrier pixels 21T are configured to be positioned so that image light from the plurality of left-eye visible regions 17L is incident on the left eye 5L of the user. The plurality of first barrier pixels 21T are configured to be positioned so that image light from the plurality of right-eye visible regions 17R is incident on the right eye 5R of the user. The second barrier pixel 21S can be configured at a position where an incident amount on the left eye 5L of the user by image light from the left-eye non-visible region 18L is reduced. The second barrier pixel 21S can be configured at a position where an incident amount on the right eye 5R of the user by image light from the right-eye non-visible region 18R is reduced. In other words, the second barrier pixel 21S can be configured at a position where the incidence of image light from the plurality of left-eye non-visible region 18L on the left eye 5L of the user is impeded or reduced. The second barrier pixel 21S can be configured at a position where the incidence of image light from the plurality of right-eye non-visible region 18R on the right eye 5R of the user is impeded or reduced.

The display panel 10 is configured to display a plurality of left-eye images in the plurality of left-eye visible regions 17L and display a plurality of right-eye images in the plurality of right-eye visible regions 17R. In this case, the user visually recognizes the left-eye image with the left eye 5L and visually recognizes the right-eye image with the right eye 5R. When the left-eye visible regions 17L and the right-eye visible regions 17R partially overlap, the overlapping part is visually recognized from both the left eye 5L and the right eye 5R. A state including at least one of a state in which the user is visually recognizing at least a part of the right-eye images with the left eye 5L and a state in which the user is visually recognizing at least a part of the left-eye images with the right eye 5R is also referred to as crosstalk. The crosstalk deteriorates the image quality of the stereoscopic vision provided to the user.

When the left-eye visible region 17L is included in the right-eye non-visible region 18R and the right-eye visible region 17R is included in the left-eye non-visible region 18L, crosstalk is reduced. When the left-eye visible region 17L and the right-eye non-visible region 18R coincide with each other and the right-eye visible region 17R and the left-eye non-visible region 18L coincide with each other, the region that the user can visually recognize becomes wider while reducing the crosstalk. As a result, the image quality of the stereoscopic vision provided to the user is improved. The controller 30 may be configured to control the plurality of display boundaries 15 and the plurality of barrier boundaries 25 so as to widen the left-eye visible region 17L and the right-eye visible region 17R while reducing crosstalk. For example, the controller 30 may be configured to control the plurality of display boundaries 15 and the plurality of barrier boundaries 25 so that the plurality of rays of image light related to the left-eye image are not incident on or difficult to be incident on the right eye 5R of the user and the plurality of rays of image light related to the right-eye image are not incident on or difficult to be incident on the left eye 5L of the user. By doing so, the head-up display 100 can reduce crosstalk.

Figure 6:
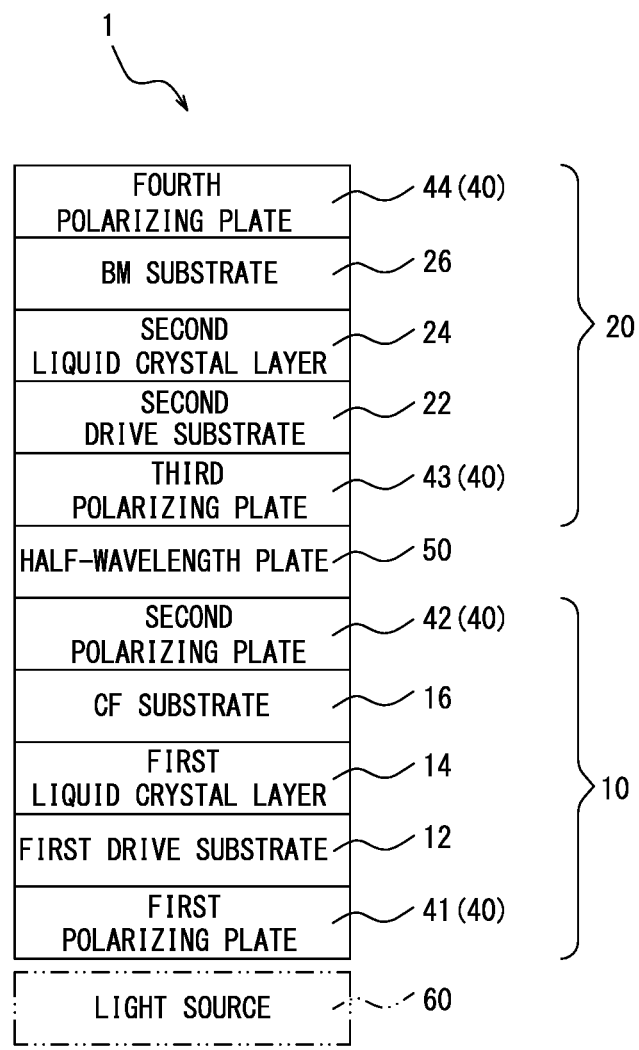
FIG. 6 is a diagram illustrating a configuration example of the display device in which the barrier panel is positioned on a user side.
Figure 7:
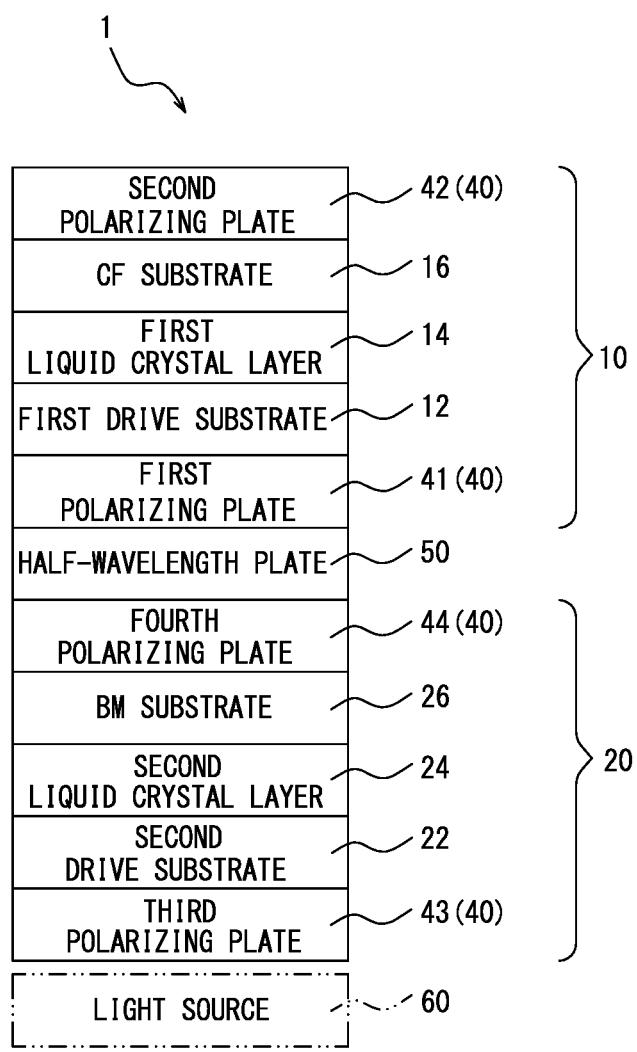
FIG. 7 is a diagram illustrating a configuration example of the display device in which the display panel is positioned on the user side.

In the configuration exemplified in FIG. 1, the barrier panel 20 is positioned on a side closer to the optical system 2 than the display panel 10. In this case, the display device 1 may have a laminated structure as illustrated in FIG. 6. The barrier panel 20 may be positioned on the side farther from the optical system 2 than the display panel 10. In this case, the display device 1 may have a laminated structure as illustrated in FIG. 7. In FIGS. 6 and 7, the configuration positioned upward is assumed to be positioned closer to the optical system 2. The half-wavelength plate 50 can be positioned between the display panel 10 and the barrier panel 20. The half-wavelength plate 50 is configured to be able to transmit light incident from any one of the display panel 10 and the barrier panel 20 and emit light as light to be emitted to the other.

The display panel 10 includes a first polarizing plate 41, a first drive substrate 12, a first liquid crystal layer 14, a color filter substrate 16, and a second polarizing plate 42. The color filter substrate 16 is also referred to as a CF (Color Filter) substrate. The barrier panel 20 includes a third polarizing plate 43, a second drive substrate 22, a second liquid crystal layer 24, a black matrix substrate 26, and a fourth polarizing plate 44. The black matrix substrate 26 is also referred to as a BM (Black Matrix) substrate. The first polarizing plate 41, the second polarizing plate 42, the third polarizing plate 43, and the fourth polarizing plate 44 are also referred to as a polarizing plate 40. The display panel 10 and the barrier panel 20 each include pixels. The pixels may be aligned two-dimensionally. The pixels may be aligned in a grid shape.

The display device 1 may further include a light source 60 such as an LED (Light Emission Diode). In the configuration illustrated in FIG. 6, the light from the light source 60 may be made incident on the first polarizing plate 41 and be emitted from the fourth polarizing plate 44. In the configuration illustrated in FIG. 7, the light from the light source 60 may be made incident on the third polarizing plate 43 and be emitted from the second polarizing plate 42.

The first drive substrate 12 and the second drive substrate 22 are configured to control the polarization direction of the liquid crystal in each pixel of the first liquid crystal layer 14 and the second liquid crystal layer 24, respectively. The first drive substrate 12 and the second drive substrate 22 include an electrode configured to apply a voltage to the liquid crystal and a switching element such as a TFT (Thin Film Transistor). The first drive substrate 12 and the second drive substrate 22 are configured to control the orientation of the liquid crystal by controlling the voltage to be applied to each pixel. The first drive substrate 12 and the second drive substrate 22 are also simply referred to as drive substrates. The first drive substrate 12 and the second drive substrate 22 may have the same configuration. Cost reduction can be realized by configuring the first drive substrate 12 and the second drive substrate 22 to have the same configuration. In this embodiment, it is assumed that the first drive substrate 12 and the second drive substrate 22 have the same configuration.

The first liquid crystal layer 14 and the second liquid crystal layer 24 contain liquid crystals. The first liquid crystal layer 14 and the second liquid crystal layer 24 are also simply referred to as liquid crystal layers. The first liquid crystal layer 14 and the second liquid crystal layer 24 may be configured to have the same configuration. Cost reduction can be realized by configuring the first liquid crystal layer 14 and the second liquid crystal layer 24 to have the same configuration. In this embodiment, the first liquid crystal layer 14 and the second liquid crystal layer 24 are assumed to have the same configuration.

The color filter substrate 16 includes a layer of a color resist configured to transmit light of each color of, for example, red, green, and blue on a side facing the first liquid crystal layer 14. The arrangement of the color resist of each color corresponds to each pixel of the display panel 10. Each pixel of the color filter substrate 16 is configured to transmit light of a color corresponding to the color of the arranged color filter. The color filter substrate 16 includes a layer of black matrix between the color resists. The black matrix partitions respective pixels of the display panel 10.

The black matrix substrate 26 includes a layer of a black matrix that partitions respective pixels of the barrier panel 20. Each pixel of the black matrix substrate 26 is configured to transmit light of any color.

The color filter substrate 16 may be one in which the black matrix substrate 26 further includes a layer of the color resist. That is, the black matrix layer may be configured to have the same configuration in the color filter substrate 16, and the black matrix substrate 26. Cost reduction can be realized by configuring the layers of the black matrix to have the same configuration.

The half-wavelength plate 50 is configured to change the polarization direction of passing light by allowing a phase difference of 180 degrees to occur between two orthogonal polarization components. When linearly polarized light passes through the half-wavelength plate 50, the polarization direction of the light changes in a direction line-symmetrically with respect to an optical axis 50a (see FIG. 10) of the half-wavelength plate 50. The half-wavelength plate 50 may contain a birefringent material configured to change a phase of the passing light depending on the polarization direction of the light. The half-wavelength plate 50 may change the polarization direction of light having a wide band wavelength including visible light.

The polarizing plate 40 is configured to pass light having a polarization direction extending along a predetermined direction. The polarization direction of the light passed through the polarizing plate 40 is represented as a polarization axis. That is, the polarizing plate 40 has the polarization axis. The transmittance of the polarizing plate 40 becomes maximum for light having a polarization direction extending along the polarization axis and minimum for light having a polarization direction orthogonal to the polarization axis.

Figure 8:
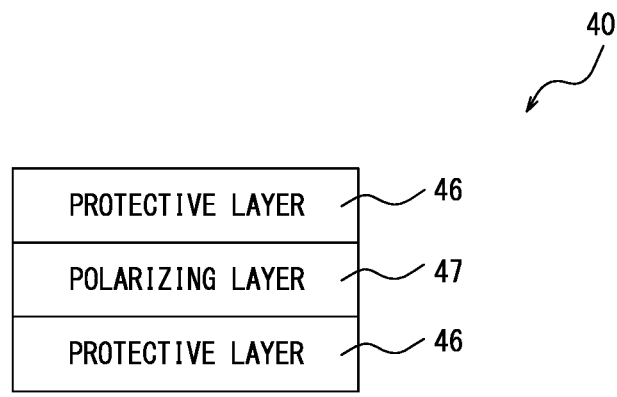
FIG. 8 is a diagram illustrating a configuration example of a polarizing plate.

As illustrated in FIG. 8, the polarizing plate 40 may have a polarizing layer 47 and protective layers 46 positioned on both sides of the polarizing layer 47 so as to protect the polarizing layer 47. The protective layer 46 may be made of, for example, TAC (Tri-Acetyl Cellulose). The polarizing layer 47 may be made of, for example, PVA (Poly-Vinyl Alcohol), or the like on which molecules of an iodine compound are adsorbed. The PVA on which molecules of the iodine compound are adsorbed allows polarized light to pass along the direction determined based on the orientation direction of the molecules of the iodine compound. That is, the PVA on which molecules of the iodine compound are adsorbed allows a polarization axis to occur in the polarizing layer 47.

The display panel 10 is configured to form a parallax image by controlling the transmittance in each pixel. The display panel 10 is configured to emit image light related to the parallax image. The barrier panel 20 is configured to form a barrier by controlling the transmittance in each pixel. That is, the display panel 10 and the barrier panel 20 are configured so that the transmittance can be controlled in each pixel. The barrier panel 20 may be configured to control the second liquid crystal layer 24 so that the transmittance of the plurality of first barrier pixels 21T is equal to or higher than the first transmittance and the transmittance of the plurality of second barrier pixels 21S is less than the second transmittance. The image light related to each of the left-eye image and the right-eye image included in the parallax image formed by the display panel 10 is incident on the left eye 5L and the right eye 5R of the user, so that the user can see the image stereoscopically.

The liquid crystal layer has birefringence. When the traveling direction of light passing through the liquid crystal layer coincides with the orientation direction of the liquid crystal, a refractive index of the liquid crystal with respect to the light is the same regardless of the polarization direction of light.

When the traveling direction of the light passing through the liquid crystal layer is orthogonal to the orientation direction of the liquid crystal, the refractive index of the liquid crystal with respect to the light is determined based on an angle between the orientation direction of the liquid crystal and the polarization direction of the passing light. The light polarized in a direction orthogonal to the orientation direction of the liquid crystal is also referred to as ordinary light. The light polarized in a direction that coincides with the orientation direction of the liquid crystal is also referred to as extraordinary light. The refractive index of a liquid crystal with respect to ordinary light is also referred to as an ordinary refractive index. The refractive index of a liquid crystal with respect to extraordinary light is also referred to as an extraordinary refractive index. A phase difference between ordinary light and extraordinary light passing the liquid crystal layer occurs due to the difference between the ordinary refractive index and the extraordinary refractive index.

The light incident on the liquid crystal layer included in the panel becomes linearly polarized light having a polarization direction extending along the polarization axis of the polarizing plate 40 by passing through the polarizing plate 40 positioned on the incident side of the panel. The linearly polarized light incident on the liquid crystal layer is emitted by being changed to elliptically polarized light or circularly polarized light or is emitted as linearly polarized light as it is. When the phase difference occurring between ordinary light and extraordinary light is 0 degrees or 360 degrees, the linearly polarized light incident on the liquid crystal layer is emitted from the liquid crystal as linearly polarized light having the same polarization direction as the polarization direction when the linearly polarized light is incident. When the phase difference occurring between ordinary light and extraordinary light is 180 degrees, the linearly polarized light incident on the liquid crystal layer is emitted from the liquid crystal as linearly polarized light having a polarization direction orthogonal to the polarization direction when the linearly polarized light is incident. When the phase difference occurring between ordinary light and extraordinary light is 90 degrees or 270 degrees, the linearly polarized light incident on the liquid crystal layer is changed to circularly polarized light and emitted. When the phase difference occurring between ordinary light and extraordinary light is different from a multiple of 90 degrees, the linearly polarized light incident on the liquid crystal layer is changed to elliptically polarized light and emitted.

The light emitted from the panel including the liquid crystal layer becomes linearly polarized light having a polarization direction extending along the polarization axis of the polarizing plate 40 by passing through the polarizing plate 40 positioned on the emission side of the panel. By changing linearly polarized light to elliptically polarized light or circularly polarized light or changing the polarization direction of linearly polarized light by the liquid crystal layer, the intensity of the light passing through the polarizing plate 40 positioned on the emission side of the panel changes.

By applying a voltage to the liquid crystal layer by the drive substrate, the orientation direction of the liquid crystal in the liquid crystal layer is controlled. By controlling the orientation direction of the liquid crystal, the phase difference occurring between ordinary light and extraordinary light passing through the liquid crystal layer is controlled. By controlling the phase difference, the intensity of linearly polarized light in the polarization direction extending along the polarization axis of the polarizing plate 40 positioned on the emission side of the panel is controlled. That is, the controller 30 can control the intensity of the light emitted from the panel by controlling the magnitude of the voltage to be applied to the liquid crystal layer. The controller 30 can control the intensity of the light emitted from each pixel by controlling the magnitude of the voltage to be applied to the liquid crystal layer in each pixel.

The liquid crystal layer may be configured so as not to allow a phase difference to occur between ordinary light and extraordinary light passing through the liquid crystal layer in a state where no voltage is applied. The liquid crystal layer may be configured to allow a phase difference of 180 degrees to occur between ordinary light and extraordinary light passing through the liquid crystal layer in a state where a predetermined voltage is applied. When the phase difference of 180 degrees occurs between ordinary light and extraordinary light, the polarization direction of the light emitted from the liquid crystal layer is orthogonal to the polarization direction of the incident light. When the polarization axis of the polarizing plate 40 on the incident side of the panel and the polarization axis of the polarizing plate 40 on the emission side of the panel are orthogonal to each other, the transmittance of each pixel can become minimum when no voltage is applied to the liquid crystal layer of the pixel and can become the maximum when a predetermined voltage is applied to the liquid crystal layer of the pixel.

Crosstalk can be reduced by controlling the display boundary 15 and the barrier boundary 25 based on the gap by the controller 30. The gap corresponds to the distance between the image-forming surface of image light on the display panel 10 and the image-forming surface of image light on the barrier panel 20. The display panel 10 and the barrier panel 20 are configured to form an image on the image-forming surface.

In the laminated structure exemplified in FIG. 6, the parallax image formed by the display panel 10 is formed on a layer of the color filter included in the color filter substrate 16. It is assumed that the layer of the color filter is on the side of the first liquid crystal layer 14. In this case, the image of the image light is formed between the first liquid crystal layer 14, and the color filter substrate 16. That is, the image-forming surface on the display panel 10 is positioned between the first liquid crystal layer 14 and the color filter substrate 16. The image light related to the parallax image formed by the display panel 10 is incident on the barrier panel 20. The image of the image light is formed on the polarizing layer 47 of the fourth polarizing plate 44. That is, the image-forming surface on the barrier panel 20 is positioned on the polarizing layer 47. The user visually recognizes the image formed on the image-forming surface of the barrier panel 20. The image formed on the image-forming surface of the barrier panel 20 includes a left-eye image including the image light reaching the left eye 5L of the user and a right-eye image including the image light reaching the right eye 5R of the user.

From the above, the gap in the laminated structure exemplified in FIG. 6 corresponds to the distance between the image-forming surface positioned between the first liquid crystal layer 14 and the color filter substrate 16 and the image-forming surface positioned on the polarizing layer 47 of the fourth polarizing plate 44.

In the laminated structure exemplified in FIG. 7, the barrier panel 20 forms a barrier image including a plurality of light-transmitting pixels and a plurality of dimming pixels and emits the image light thereof onto the display panel 10. The barrier image formed by the barrier panel 20 is formed on the polarizing layer 47 of the fourth polarizing plate 44. That is, the image-forming surface on the barrier panel 20 is positioned on the polarizing layer 47. The image light related to the barrier image formed by the barrier panel 20 is incident on the display panel 10. The image of the image light is formed between the first liquid crystal layer 14 and the color filter substrate 16. That is, the image-forming surface on the display panel 10 is positioned between the first liquid crystal layer 14 and the color filter substrate 16. The user visually recognizes the image formed on the image-forming surface of the display panel 10. The image formed on the image-forming surface of the display panel 10 includes a left-eye image including the image light reaching the left eye 5L of the user and a right-eye image including the image light reaching the right eye 5R of the user.

From the above, the gap in the laminated structure exemplified in FIG. 7 corresponds to the distance between the image-forming surface positioned on the polarizing layer 47 of the fourth polarizing plate 44 and the image-forming surface positioned between the first liquid crystal layer 14 and the color filter substrate 16.

The gap in the laminated structure exemplified in FIGS. 6 and 7 commonly includes the thickness of the two polarizing plates 40, the thickness of the half-wavelength plate 50, the thickness of the drive substrate, and the thickness of the liquid crystal layer. The gap in the laminated structure exemplified in FIG. 6 further includes the thickness of the color filter substrate 16 and the thickness of the black matrix substrate 26. That is, the gap in the laminated structure exemplified in FIG. 6 is wider than the gap in the laminated structure exemplified in FIG. 7 by the thicknesses of the color filter substrate 16 and the black matrix substrate 26.

Also, in the laminated structure exemplified in any of FIGS. 6 and 7, the user visually recognizes the image formed by a panel of the display panel 10 and the barrier panel 20 which is on a side closer to the user. That is, the display device 1 is configured to form an image visually recognized by the user on the image forming surface of the panel of the display panel 10 and the barrier panel 20 which is on a side closer to the user.

Figure 9:
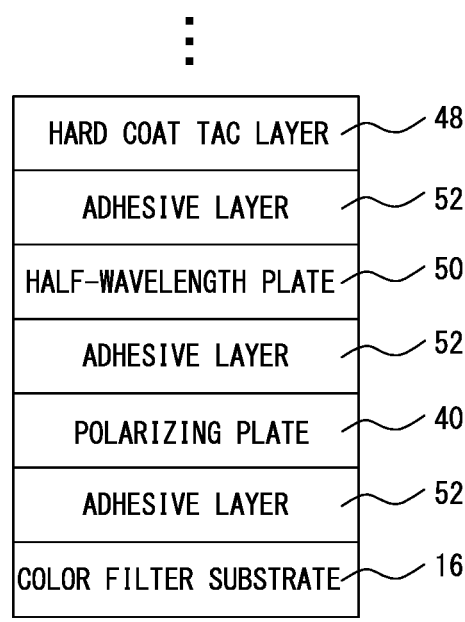
FIG. 9 is a diagram illustrating a configuration example in which the polarizing plate and another configuration are adhered by an adhesive layer.

As illustrated in FIG. 9, the polarizing plate 40 and another layer such as the half-wavelength plate 50 or the color filter substrate 16 may be adhered by an adhesive layer 52. The adhesive layer 52 may be, for example, an optical clear adhesive (OCA) film or an optical clear resin (OCR). The gap further includes the thickness of the adhesive layer 52.

In the display device 1, the gap is determined by a hardware configuration. When the display device 1 includes the half-wavelength plate 50, the gap is determined based on the thickness of the half-wavelength plate 50. That is, in the display device 1, the gap can be changed by changing the thickness of the half-wavelength plate 50.

The display device 1 may further include a hard coat TAC layer 48. The hard coat TAC layer 48 may be a TAC including a hard coat layer on the surface. The hard coat TAC layer 48 may be adhered to the half-wavelength plate 50 by the adhesive layer 52. When the display device 1 further includes the hard coat TAC layer 48 between the display panel 10 and the barrier panel 20, the gap further includes the thickness of the hard coat TAC layer 48. The gap is also determined based on the thickness of the hard coat TAC layer 48. That is, in the display device 1, the gap can be changed by changing the thickness of the hard coat TAC layer 48.

Figure 10:
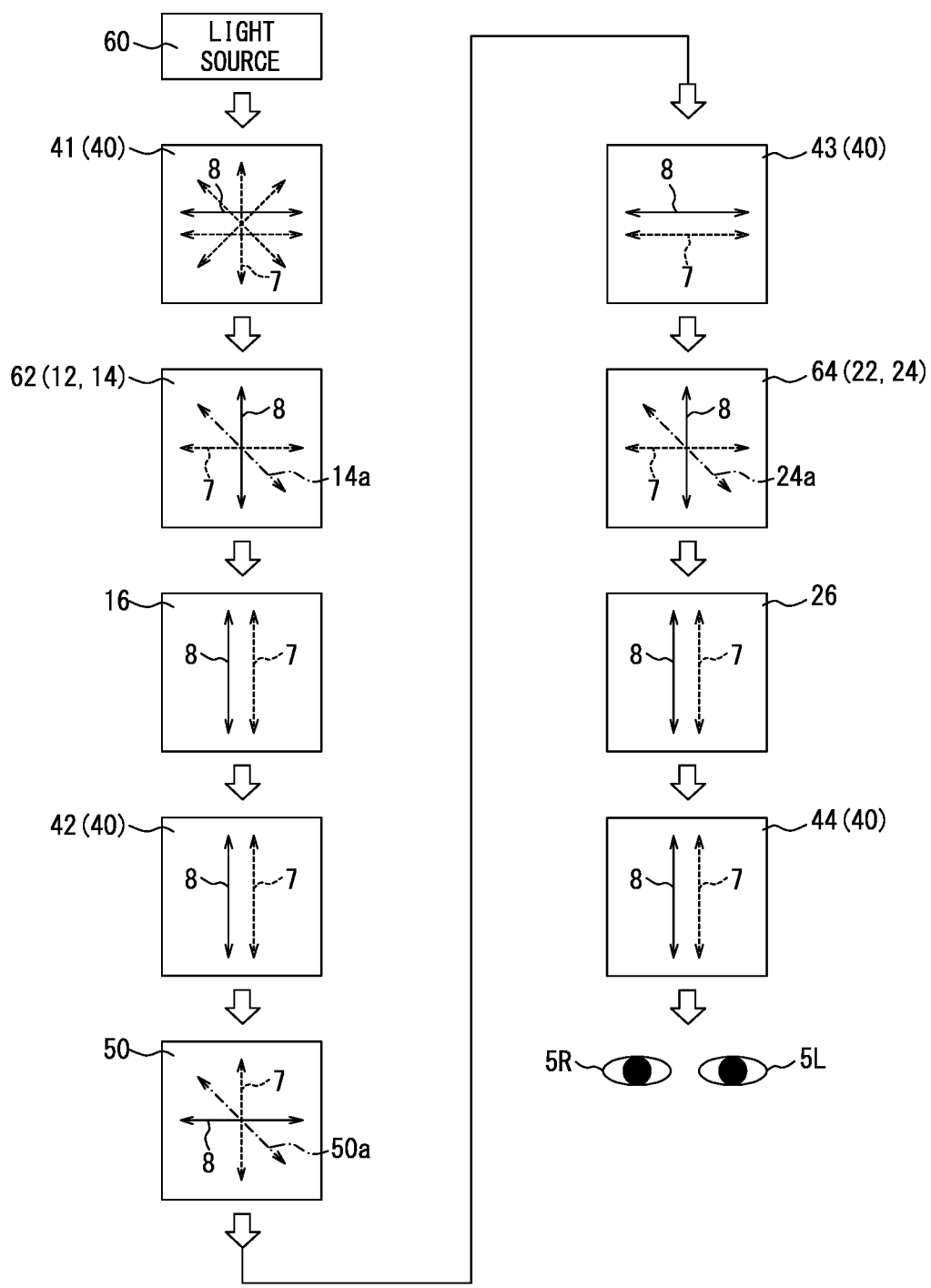
FIG. 10 is a diagram illustrating an example of a change in a polarization direction, in the configuration of FIG. 6.

As illustrated in FIG. 10, it is configured such that light emitted from the light source 60 is made incident on the first polarizing plate 41. The incident light 7 on the first polarizing plate 41 includes linearly polarized light in various polarization directions as represented by broken lines with arrows on both sides. It is assumed that the polarization axis of the first polarizing plate 41 extends along the horizontal direction. As the linearly polarized light in the horizontal direction is transmitted through the first polarizing plate 41, the emission light 8 from the first polarizing plate 41 becomes linearly polarized light in the horizontal direction as represented by the solid line with arrows on both sides. The display device 1 is configured such that the emission light 8 that is transmitted through the first polarizing plate 41 and is linearly polarized in the horizontal direction is incident on the configuration in which the first drive substrate 12 and the first liquid crystal layer 14 are laminated.

The configuration in which the first drive substrate 12 and the first liquid crystal layer 14 are laminated is configured to control the polarization direction of the emission light 8. The configuration in which the first drive substrate 12 and the first liquid crystal layer 14 are laminated is also referred to as a first polarization control layer 62. The first polarization control layer 62 is configured to control the phase difference occurring between ordinary light and extraordinary light passing through the liquid crystal layer by controlling the orientation direction of the liquid crystal. The first polarization control layer 62 is configured to control the polarization direction of the emission light 8 by controlling the phase difference. The first liquid crystal layer 14 includes an optical axis 14a. It is assumed that the direction of the optical axis 14a is a direction having an inclination of 45 degrees with respect to the polarization direction of the incident light 7, as represented by a one-dot chain line with arrows on both sides. It can be said that the direction of the optical axis 14a is a direction having an inclination of 45 degrees with respect to the direction of an orientation axis of the liquid crystal.

The incident light 7 on the first polarization control layer 62 is linearly polarized light in the horizontal direction as represented by the broken line with arrows on both sides. As the phase difference occurring between ordinary light and extraordinary light becomes larger than 0 degrees and approaches 180 degrees, a proportion of linearly polarized light in the vertical direction, which is included in the emission light 8 and represented by the solid line with arrows on both sides, increases. When the phase difference occurring between ordinary light and extraordinary light is 180 degrees, the proportion of linearly polarized light in the vertical direction, included in the emission light 8 becomes maximum. In this case, the emission light 8 may be regarded as linearly polarized light in the vertical direction.

The phase difference occurring between ordinary light and extraordinary light is determined based on the magnitude of the voltage applied by the first drive substrate 12 to the first liquid crystal layer 14. That is, the first polarization control layer 62 is configured to control the proportion of the linearly polarized light in the horizontal direction and the linearly polarized light in the vertical direction, included in the emission light 8, by controlling the magnitude of the voltage applied from the first drive substrate 12 to the first liquid crystal layer 14.

The color filter substrate 16 is configured to emit the light incident from the first polarization control layer 62 on the second polarizing plate 42 as it is without changing the polarization direction thereof. For example, when the incident light 7 on the color filter substrate 16 is linearly polarized light in the vertical direction, the emission light 8 is linearly polarized light in the vertical direction.

The second polarizing plate 42 is configured to transmit a polarized component along the polarization axis of the incident light 7 and emit the polarized component as the emission light 8. The display device 1 is configured to control the intensity of the light emitted from the display panel 10 by controlling the proportion of linearly polarized light along the polarization axis of the second polarizing plate 42 by the first polarization control layer 62.

It is assumed that the polarization axis of the second polarizing plate 42 extends along the vertical direction. That is, it is assumed that the polarization axis of the second polarizing plate 42 is orthogonal to the polarization axis of the first polarizing plate 41. In this case, as the voltage applied to the first liquid crystal layer 14 by the first polarization control layer 62 approaches a predetermined voltage, the intensity of the light emitted from the display panel 10 increases.

The light emitted from the second polarizing plate 42 of the display panel 10 is incident on the half-wavelength plate 50. The half-wavelength plate 50 includes an optical axis 50a represented by a one-dot chain line with arrows on both sides. The half-wavelength plate 50 is configured to change the polarization direction of the incident light line-symmetrically with respect to the optical axis 50a. That is, the polarization direction of the light incident on the half-wavelength plate 50 and the polarization direction of the light emitted from the half-wavelength plate 50 have a line symmetrical relationship with respect to the optical axis 50a. The optical axis 50a is configured such that the polarization axis of the second polarizing plate 42 and the polarization axis of the third polarizing plate 43 have a line-symmetrical relationship. When the polarization axis of the second polarizing plate 42 and the polarization axis of the third polarizing plate 43 are orthogonal to each other, the optical axis 50a extends along a direction having an inclination of 45 degrees with respect to the polarization axis of the second polarizing plate 42. In this case, the polarization axis of the first polarizing plate 41 and the polarization axis of the third polarizing plate 43 coincide with each other.

When the incident light 7 on the half-wavelength plate 50 is linearly polarized light in the vertical direction, the emission light 8 from the half-wavelength plate 50 becomes linearly polarized light in the horizontal direction.

The third polarizing plate 43 is configured to transmit a polarized component along the polarization axis out of the incident light 7 and emit the polarized component as the emission light 8. It is assumed that the polarization axis of the third polarizing plate 43 extends along the horizontal direction. When the incident light 7 on the third polarizing plate 43 is linearly polarized light in the horizontal direction, it is configured such that the incident light 7 is transmitted through the third polarizing plate 43 and is emitted as it is.

The configuration in which the second drive substrate 22 and the second liquid crystal layer 24 are laminated is also referred to as a second polarization control layer 64. The second polarization control layer 64 is configured to control the polarization direction of the emission light 8 by controlling the orientation direction of the liquid crystal in the same manner as or similar to the first polarization control layer 62. The second liquid crystal layer 24 includes an optical axis 24a. It is assumed that the direction of the optical axis 24a is a direction having an inclination of 45 degrees with respect to the polarization direction of the incident light 7, as represented by a one-dot chain line with arrows on both sides. It can be said that the direction of the optical axis 24a is a direction having an inclination of 45 degrees with respect to the direction of the orientation axis of the liquid crystal.

The incident light 7 on the second polarization control layer 64 is linearly polarized light in the horizontal direction as represented by the broken line with arrows on both sides. As the phase difference occurring between ordinary light and extraordinary light becomes larger than 0 degrees and approaches 180 degrees, the proportion of linearly polarized light in the vertical direction, which is included in the emission light 8 and represented by the solid line with arrows on both sides, increases. When the phase difference occurring between ordinary light and extraordinary light is 180 degrees, the proportion of linearly polarized light in the vertical direction included in the emission light 8 becomes maximum. In this case, the emission light 8 may be regarded as linearly polarized light in the vertical direction.

The phase difference occurring between ordinary light and extraordinary light is determined based on the magnitude of the voltage applied by the second drive substrate 22 to the second liquid crystal layer 24. That is, the second polarization control layer 64 is configured to control the proportion of the linearly polarized light in the horizontal direction and the linearly polarized light in the vertical direction, included in the emission light 8, by controlling the magnitude of the voltage applied from the second drive substrate 22 to the second liquid crystal layer 24.

The black matrix substrate 26 emits light incident from the second polarization control layer 64 on the fourth polarizing plate 44 as it is without changing the polarization direction thereof. For example, when the incident light 7 on the black matrix substrate 26 is linearly polarized light in the vertical direction, the emission light 8 is linearly polarized light in the vertical direction.

The fourth polarizing plate 44 is configured to transmit a polarized component along the polarization axis out of the incident light 7 and emit the polarized component as the emission light 8. The second polarization control layer 64 is configured to make each pixel either a light-transmitting pixel or a dimming pixel by controlling whether the emission light 8 is linearly polarized along the polarization axis of the fourth polarizing plate 44 or linearly polarized light orthogonal to the polarization axis of the fourth polarizing plate 44, in the pixel. By doing so, the barrier panel 20 forms a barrier including a plurality of light-transmitting regions and a plurality of dimming regions. The emission light 8 of the barrier panel 20 travels toward the left eye 5L and right eye 5R of the user.

The emission light 8 of the barrier panel 20 directing toward the left eye 5L and right eye 5R of the user is linearly polarized light in the vertical direction. In this case, the user can visually recognize the light emitted from the barrier panel 20 even when wearing polarized sunglasses that cut linearly polarized light in the horizontal direction.

Figure 11:
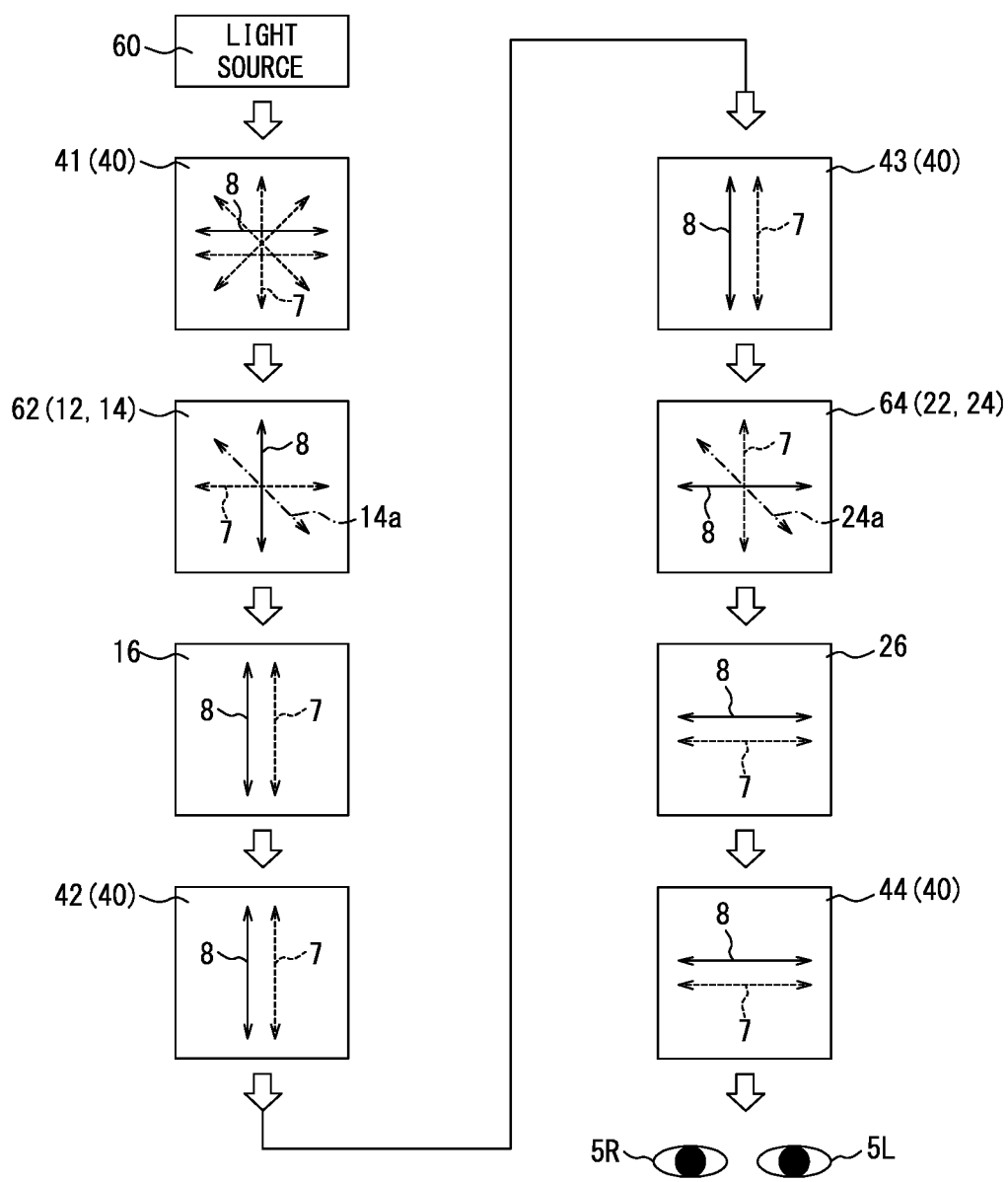
FIG. 11 is a diagram illustrating a change in a polarization direction, in a configuration according to a comparative example.

The configuration according to a comparative example illustrated in FIG. 11 does not include the half-wavelength plate 50. In this case, the incident light 7 on the third polarizing plate 43 is linearly polarized light in the vertical direction, unlike the configuration illustrated in FIG. 10. Accordingly, finally, the emission light 8 from the fourth polarizing plate 44 is linearly polarized light in the horizontal direction. In this case, if the user wears polarized sunglasses that cut light having polarization in the horizontal direction, the emission light 8 from the fourth polarizing plate 44 is cut by the polarized sunglasses and does not reach the user's eyes.

The display device 1 according to this embodiment includes the half-wavelength plate 50, thereby allowing the user to visually recognize the image even when the user wears polarized sunglasses.

When the half-wavelength plate 50 is positioned closer to the user than the polarizing plate 40, a phenomenon in which the half-wavelength plate 50 appears rainbow-colored may occur. In this case, the quality of stereoscopic vision can be reduced. By positioning the half-wavelength plate 50 behind the polarizing plate 40 when viewed from the user, the phenomenon in which the half-wavelength plate 50 appears rainbow-colored does not occur. As a result, the quality of stereoscopic vision is improved.

By positioning the half-wavelength plate 50 behind the polarizing plate 40 when viewed from the user, the gap is determined based on the thickness of the half-wavelength plate 50. When the display device 1 is used for the head-up display 100, the parallax image generated by the display device 1 is projected onto both eyes of the user via the optical system 2. The observation distance in the configuration in which the parallax image is projected onto the user's eyes is longer than the observation distance in the configuration in which the parallax image is directly viewed by the user's eyes. The longer the observation distance, the wider the gap can be set. The gap can be widened by inserting the half-wavelength plate 50. As a result, a member for widening the gap can be omitted.

By disposing the half-wavelength plate 50 between the display panel 10 and the barrier panel 20, the orientation direction of the liquid crystal in the first liquid crystal layer 14 and the orientation direction of the liquid crystal in the second liquid crystal layer 24 can be made the same. The polarization axis of the polarizing plate 40 on the display panel 10 and the polarization axis of the polarizing plate 40 on the barrier panel 20 can be made the same. In this way, cost reduction is realized by increasing the number of configurations that are made common to each other between the display panel 10 and the barrier panel 20.

Figure 12:
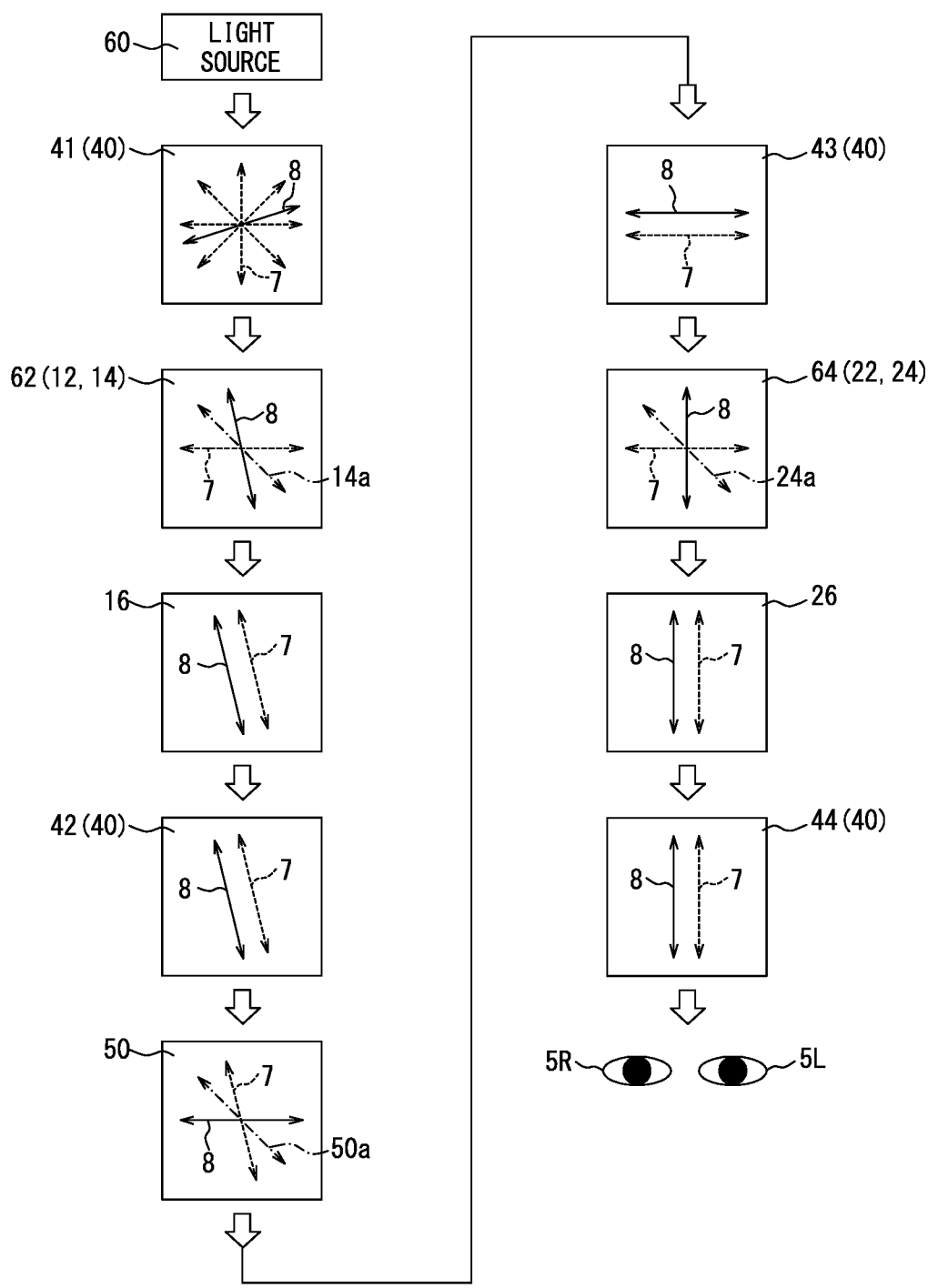
FIG. 12 is a diagram illustrating an example of a change in a polarization direction, in a configuration in which a polarization axis of a first polarizing plate is inclined with respect to a horizontal direction.

As illustrated in FIG. 12, the polarization axis of the first polarizing plate 41 may be inclined with respect to the polarization axis of the third polarizing plate 43. The configuration illustrated in FIG. 12 can be realized, for example, when the display panel 10 and the barrier panel 20 each have a polarization axis extending along the same direction and the display panel 10 is installed to be inclined with respect to the barrier panel 20. In this configuration, the polarization direction of the emission light 8 from the display panel 10 is inclined with respect to the polarization axis of the third polarizing plate 43 of the barrier panel 20.

The half-wavelength plate 50 can align the polarization direction of the emission light 8 from the display panel 10 with the polarization axis of the third polarizing plate 43. The direction of the optical axis 50a of the half-wavelength plate 50 can be appropriately set so that the polarization direction of the emission light 8 from the half-wavelength plate 50 is aligned with the polarization axis of the third polarizing plate 43. Even when the emission light 8 from the barrier panel 20 becomes the incident light 7 on the display panel 10, the half-wavelength plate 50 aligns the polarization direction of the incident light 7 with the polarization axis of the first polarizing plate 41.

The display device 1 according to the present embodiment can easily align the polarization direction of the light incident on the panel with the polarization axis of the polarizing plate 40 positioned on the incident side, by including the half-wavelength plate 50 between the display panel 10 and the barrier panel 20. By doing so, the polarization axis of the display panel 10 and the polarization axis of the barrier panel 20 can be made the same. As a result, cost reduction can be realized through the commonization of the configurations.

In the configuration illustrated in FIG. 6, the second polarizing plate 42 may be omitted. Even when the second polarizing plate 42 is absent, the polarization direction of the light incident on the second liquid crystal layer 24 is limited by the third polarizing plate 43. In the configuration illustrated in FIG. 7, the fourth polarizing plate 44 may be omitted. Even when the fourth polarizing plate 44 is absent, the polarization direction of the light incident on the first liquid crystal layer 14 is limited by the first polarizing plate 41. Cost reduction can be made by omitting the second polarizing plate 42 or the fourth polarizing plate 44.

The display device 1 and the head-up display 100 according to the embodiments may be equipped on a moving body such as a vehicle. In this case, an optical member 3c may be a front windshield of the vehicle or the like.

"Moving bodies" in the disclosure include vehicles, ships, and aircraft. "Vehicles" in the disclosure include, but are not limited to, automobiles and industrial vehicles and may include railway vehicles, living vehicles, and fixed-wing aircraft traveling on runways. Automobiles include, but are not limited to, passenger cars, trucks, buses, motorcycles, trolleybuses, and the like and may include other vehicles traveling on the road. The industrial vehicles include industrial vehicles for agriculture and construction. The industrial vehicles include, but are not limited to, forklifts and golf carts. The industrial vehicles for agriculture include, but are not limited to, tractors, tillers, transplanters, binders, combines, and lawnmowers. The industrial vehicles for construction include, but are not limited to, bulldozers, scrapers, excavators, crane trucks, dump trucks, and road rollers. The vehicles include those that run manually. The classification of vehicles is not limited to those described above. For example, an automobile may include an industrial vehicle capable of traveling on a road and the same vehicle may be included in a plurality of classifications. The ships in the disclosure include marine jets, boats, and tankers. The aircraft in the disclosure include fixed-wing aircraft and rotary-wing aircraft.

The configuration according to the disclosure is not limited to the embodiments described above and can be modified or changed in many ways. For example, the functions and the like included in each component and the like can be rearranged so as not to be logically inconsistent, and a plurality of components and the like can be combined into one or can be divided.

The diagrams for illustrating the configuration according to the disclosure are schematic. The dimensional ratios on the drawings do not always match the actual ones.

In the disclosure, the descriptions such as "first" and "second" are identifiers for distinguishing corresponding configurations. Configurations distinguished by the descriptions such as "first" and "second" in the disclosure can exchange numbers in the corresponding configurations. For example, first light can exchange "first" and "second", which are identifiers, with second light. The exchange of identifiers takes place at the same time. Even after exchanging identifiers, the corresponding configuration is distinguished. The identifier may be deleted. The configuration with the identifier deleted is distinguished by a reference numeral. It should not be used as a basis for interpreting the order of the corresponding configurations or the rationale for the existence of identifiers with lower numbers, based solely on the description of identifiers such as "first" and "second" in this disclosure.

In the disclosure, the X-axis, Y-axis, and Z-axis are provided for the convenience of explanation and may be interchanged with each other. The configuration according to the disclosure has been described using a Cartesian coordinate system composed of the X-axis, the Y-axis, and the Z-axis. The positional relationship of the respective configurations according to the disclosure is not limited to being in an orthogonal relationship.

REFERENCE SIGNS LIST

1: Display device
2: Optical system
2a, 2b, 2c: Optical member
3: Optical path
4: Virtual image 5L, 5R: Left eye and right eye of user
7: Incident light
8: Emission light
10: Display panel
11: Display pixel
11L: First display pixel
11R: Second display pixel
12: First drive substrate
14: First liquid crystal layer
14a: Optical axis
15: Display boundary
16: Color filter substrate
17L, 17R: Left-eye visible region, right-eye visible region
18L, 18R: Left-eye non-visible region, right-eye non-visible region
20: Barrier panel
21: Barrier pixel
21T: First barrier pixel
21S: Second barrier pixel
22: Second drive substrate
24: Second liquid crystal layer
24a: Optical axis
25: Barrier boundary
26: Black matrix substrate
30: Controller
40: Polarizing plate
41 to 44: First to fourth polarizing plates
46: Protective layer
47: Polarizing layer
48: Hard coat TAC layer
50: Half-wavelength plate
50a: Optical axis
52: Adhesive layer
60: Light source
62: First polarization control layer
64: Second polarization control layer
100: Head-up display

The invention claimed is:

1. A display device, comprising:
a first liquid crystal panel comprising a first image-forming surface for forming a first image visually recognized by a user, and a plurality of first pixels aligned in a first alignment, the first liquid crystal panel being capable of controlling light transmittance of the respective first pixels by controlling a polarization direction of light passing through the respective first pixels, the first liquid crystal panel being configured to form the first image on the first image-forming surface;
a second liquid crystal panel comprising a second image-forming surface for forming a second image visually recognized by the user, and a plurality of second pixels aligned in a second alignment, the second liquid crystal panel being capable of controlling light transmittance of the respective second pixels by controlling a polarization direction of light passing through the respective second pixels, the second liquid crystal panel being configured to form the second image on the second image-forming surface; and
a half-wavelength plate located between the first image-forming surface and the second image-forming surface,
the half-wavelength plate comprising an optical axis,
the half-wavelength plate being configured to be capable of transmitting incident light from either one liquid crystal panel of the first liquid crystal panel and the second liquid crystal panel, and
of emitting light as emission light to the other liquid crystal panel,
a polarization direction of the emission light from the half-wavelength plate being determined based on a polarization direction of the incident light on the half-wavelength plate and a direction of the optical axis,
wherein an orientation direction of liquid crystal in a first liquid crystal layer of the first liquid crystal panel and an orientation direction of liquid crystal in a second liquid crystal layer of the second liquid crystal panel are the same, and
the first liquid crystal panel and the second liquid crystal panel are panels of a vertical alignment type.

2. The display device according to claim 1, wherein at least a part of the first alignment is a same as at least a part of the second alignment.

3. The display device according to claim 1, wherein at least a part of the plurality of first pixels is configured to have a same alignment as at least a part of the plurality of second pixels.

4. The display device according to claim 1, wherein the plurality of first pixels of the first liquid crystal panel
are aligned at a first display pixel pitch along a first display alignment direction, and
are aligned at a second display pixel pitch along a second display alignment direction intersecting the first display alignment direction,
the second pixels of the second liquid crystal panel
are aligned at a first barrier pixel pitch along a first barrier alignment direction, and
are aligned at a second barrier pixel pitch along a second barrier alignment direction,
the first display alignment direction and the first barrier alignment direction coincide with each other,
the first display pixel pitch and the first barrier pixel pitch coincide with each other,
the second display alignment direction and the second barrier alignment direction coincide with each other, and
the second display pixel pitch and the second barrier pixel pitch coincide with each other.

5. The display device according to claim 1, wherein the plurality of first pixels comprise
a plurality of left-eye pixels that form a left-eye image visually recognized by a left eye of the user, and
a plurality of right-eye pixels that form a right-eye image visually recognized by a right eye of the user,
at least a part of the plurality of second pixels comprises a plurality of light-transmitting pixels and a plurality of dimming pixels,
the plurality of dimming pixels are configured to be positioned so that first light emitted from the plurality of left-eye pixels is reduced and a first incident amount of first light is incident on the right eye of the user, and so that second light emitted from the plurality of right-eye pixels is reduced and a second incident amount of second light is incident on the left eye of the user,
the plurality of light-transmitting pixels are configured to be positioned so that
the first light emitted from the plurality of left-eye pixels is incident on the left eye, and
the second light emitted from the plurality of right-eye pixels is incident on the right eye.

6. The display device according to claim 1, wherein a distance between the first image-forming surface and the second image-forming surface is determined based on a thickness of the half-wavelength plate.

7. A head-up display, comprising:
a display device; and
an optical system,
the display device comprising
- a first liquid crystal panel comprising a first image-forming surface for forming a first image visually recognized by a user, and a plurality of first pixels aligned in a first alignment, the first liquid crystal panel being capable of controlling light transmittance of the respective first pixels by controlling a polarization direction of light passing through the respective first pixels, the first liquid crystal panel being configured to form the first image on the first image-forming surface;
- a second liquid crystal panel comprising a second image-forming surface for forming a second image visually recognized by the user, and a plurality of second pixels aligned in a second alignment, the second liquid crystal panel being capable of controlling light transmittance of the respective second pixels by controlling a polarization direction of light passing through the respective second pixels, the second liquid crystal panel being configured to form the second image on the second image-forming surface; and
- a half-wavelength plate located between the first image-forming surface and the second image-forming surface, the half-wavelength plate comprising an optical axis,
the half-wavelength plate being configured to be capable
- of transmitting incident light from either one liquid crystal panel of the first liquid crystal panel and the second liquid crystal panel, and
- of emitting light as emission light to the other liquid crystal panel, a polarization direction of the emission light from the half-wavelength plate being determined based on a polarization direction of the incident light on the half-wavelength plate and the direction of the optical axis,
the optical system being configured to cause image light of an image which is formed on an image-forming surface of a liquid crystal panel of the first liquid crystal panel and the second liquid crystal panel which is on a side closer to the user, to reach a left eye and a right eye of the user, in the display device,
wherein an orientation direction of liquid crystal in a first liquid crystal layer of the first liquid crystal panel and an orientation direction of liquid crystal in a second liquid crystal layer of the second liquid crystal panel are the same, and
the first liquid crystal panel and the second liquid crystal panel are panels of a vertical alignment type.

8. The head-up display according to claim 7, wherein
at least a part of the first alignment is a same as at least a part of the second alignment.

9. The head-up display according to claim 7, wherein
at least a part of the plurality of first pixels is configured to have a same alignment as at least a part of the plurality of second pixels.

10. The head-up display according to claim 7, wherein
the plurality of first pixels of the first liquid crystal panel
- are aligned at a first display pixel pitch along a first display alignment direction, and
- are aligned at a second display pixel pitch along a second display alignment direction intersecting the first display alignment direction, the plurality of second pixels of the second liquid crystal panel
- are aligned at a first barrier pixel pitch along a first barrier alignment direction, and
- are aligned at a second barrier pixel pitch along a second barrier alignment direction, the first display alignment direction and the first barrier alignment direction coincide with each other,
the first display pixel pitch and the first barrier pixel pitch coincide with each other,
the second display alignment direction and the second barrier alignment direction coincide with each other, and
the second display pixel pitch and the second barrier pixel pitch coincide with each other.

11. The head-up display according to claim 7, wherein
the plurality of first pixels comprise
- a plurality of left-eye pixels that form a left-eye image visually recognized by the left eye of the user, and
- a plurality of right-eye pixels that form a right-eye image visually recognized by the right eye of the user, at least a part of the plurality of second pixels comprises a plurality of light-transmitting pixels and a plurality of dimming pixels,
the plurality of dimming pixels are configured to be positioned so that first light emitted from the plurality of left-eye pixels is reduced and a first incident amount of first light is incident on the right eye of the user, and
- so that second light emitted from the plurality of right-eye pixels is reduced and a second incident amount of second light is incident on the left eye of the user, the plurality of light-transmitting pixels are configured to be positioned so that
- the first light emitted from the plurality of left-eye pixels is incident on the left eye, and
- the second light emitted from the plurality of right-eye pixels is incident on the right eye.

12. The head-up display according to claim 7, wherein
a distance between the first image-forming surface and the second image-forming surface is determined based on a thickness of the half-wavelength plate.

13. A moving body, comprising:
a head-up display comprising a display device and an optical system,
the display device comprising
- a first liquid crystal panel comprising a first image-forming surface for forming a first image visually recognized by a user, and a plurality of first pixels aligned in a first alignment, the first liquid crystal panel being capable of controlling light transmittance of the respective first pixels by controlling a polarization direction of light passing through the respective first pixels, the first liquid crystal panel being configured to form the first image on the first image-forming surface,
- a second liquid crystal panel comprising a second image-forming surface for forming a second image visually recognized by the user, and a plurality of second pixels aligned in a second alignment, the second liquid crystal panel being capable of controlling light transmittance of the respective second pixels by controlling the polarization direction of light passing through the respective second pixels, the second liquid crystal panel being configured to form the second image on the second image-forming surface, and a half-wavelength plate located between the first image-forming surface and the second image-forming surface, the half-wavelength plate comprising an optical axis, the half-wavelength plate being configured to be capable of transmitting incident light from either one liquid crystal panel of the first liquid crystal panel and the second liquid crystal panel, and of emitting light as emission light to the other liquid crystal panel, a polarization direction of the emission light from the half-wavelength plate being determined based on a polarization direction of the incident light on the half-wavelength plate and the direction of the optical axis, the optical system being configured to cause image light of an image which is formed on an image-forming surface of a liquid crystal panel of the first liquid crystal panel and the second liquid crystal panel which is on a side closer to the user, to reach a left eye and a right eye of the user, in the display device, wherein an orientation direction of liquid crystal in a first liquid crystal layer of the first liquid crystal panel and an orientation direction of liquid crystal in a second liquid crystal layer of the second liquid crystal panel are the same, and the first liquid crystal panel and the second liquid crystal panel are panels of a vertical alignment type.

14. The moving body according to claim 13, wherein at least a part of the first alignment is a same as at least a part of the second alignment.

15. The moving body according to claim 13, wherein at least a part of the plurality of first pixels is configured to have a same alignment as at least a part of the plurality of second pixels.

16. The moving body according to claim 13, wherein the plurality of first pixels of the first liquid crystal panel
are aligned at a first display pixel pitch along a first display alignment direction, and
are aligned at a second display pixel pitch along a second display alignment direction intersecting the first display alignment direction, the plurality of second pixels of the second liquid crystal panel
are aligned at a first barrier pixel pitch along a first barrier alignment direction, and
are aligned at a second barrier pixel pitch along a second barrier alignment direction, the first display alignment direction and the first barrier alignment direction coincide with each other, the first display pixel pitch and the first barrier pixel pitch coincide with each other, the second display alignment direction and the second barrier alignment direction coincide with each other, and the second display pixel pitch and the second barrier pixel pitch coincide with each other.

17. The moving body according to claim 13, wherein the plurality of first pixels comprise
a plurality of left-eye pixels that form a left-eye image visually recognized by the left eye of the user, and
a plurality of right-eye pixels that form a right-eye image visually recognized by the right eye of the user, at least a part of the plurality of second pixels comprises a plurality of light-transmitting pixels and a plurality of dimming pixels, the plurality of dimming pixels are configured to be positioned so that first light emitted from the plurality of left-eye pixels is reduced and a first incident amount of first light is incident on the right eye of the user, and
so that second light emitted from the plurality of right-eye pixels is reduced and a second incident amount of second light is incident on the left eye of the user, and the plurality of light-transmitting pixels are configured to be positioned so that
the first light emitted from the plurality of left-eye pixels is incident on the left eye, and
the second light emitted from the plurality of right-eye pixels is incident on the right eye.

18. The moving body according to claim 13, wherein a distance between the first image-forming surface and the second image-forming surface is determined based on a thickness of the half-wavelength plate.

* * * * *